W. S. REEDER.
Grain-Separator.

No. 213,934.   Patented April 1, 1879.

ATTEST:
Geo. H. Knight.
Walter Allen

INVENTOR:
William S. Reeder
By Knight Bros.
Attys.

UNITED STATES PATENT OFFICE.

WILLIAM S. REEDER, OF ST. LOUIS, MISSOURI.

IMPROVEMENT IN GRAIN-SEPARATORS.

Specification forming part of Letters Patent No. 213,934, dated April 1, 1879; application filed December 19, 1878.

*To all whom it may concern:*

Be it known that I, WILLIAM S. REEDER, of the city of St. Louis, in the State of Missouri, have invented a certain new and useful Improvement in Grain-Separators, of which the following is a full, clear, and exact description, reference being had to the accompanying drawings, forming part of this specification.

The first part of my improvement consists in pivoting to the tail end of the reciprocating separating-pan an extension carrying a straw-separator, consisting of a close-bottomed case containing an endless running belt with cross-bars, running with sufficient speed to thin out the stratum of straw and allow the grain to drop out of it before it reaches the usual straw-carrier, and return to the fanning apparatus.

The second part of my improvement relates to the device for giving the motion to the carrier in the separating-pan extension; and consists in a belt, one end of which passes around a pulley upon one of the carrier-shafts, the other end of the belt passing around an eccentric pulley upon the crank-shaft, giving reciprocation to the separating-pan. The arrangement is such that the belt remains equally taut during the reciprocation of the pan.

Figure 1:
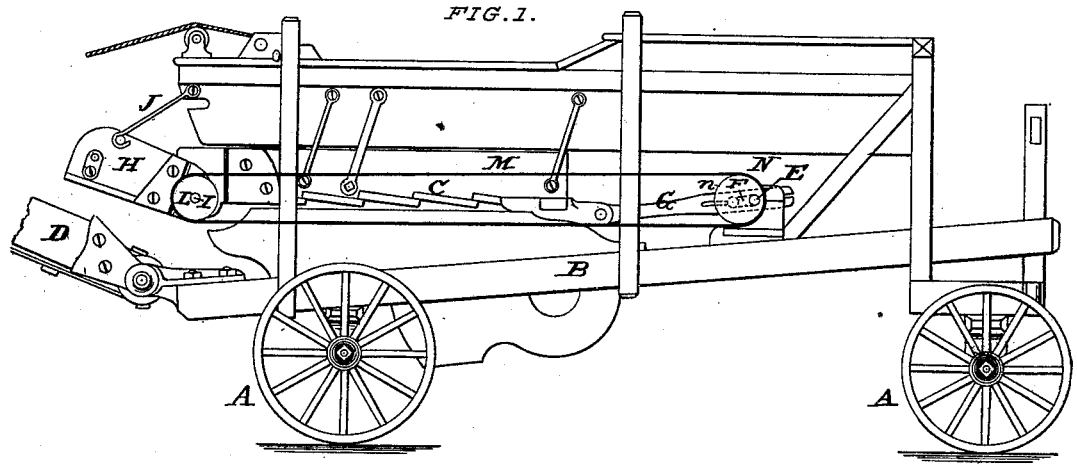
Figure 2:
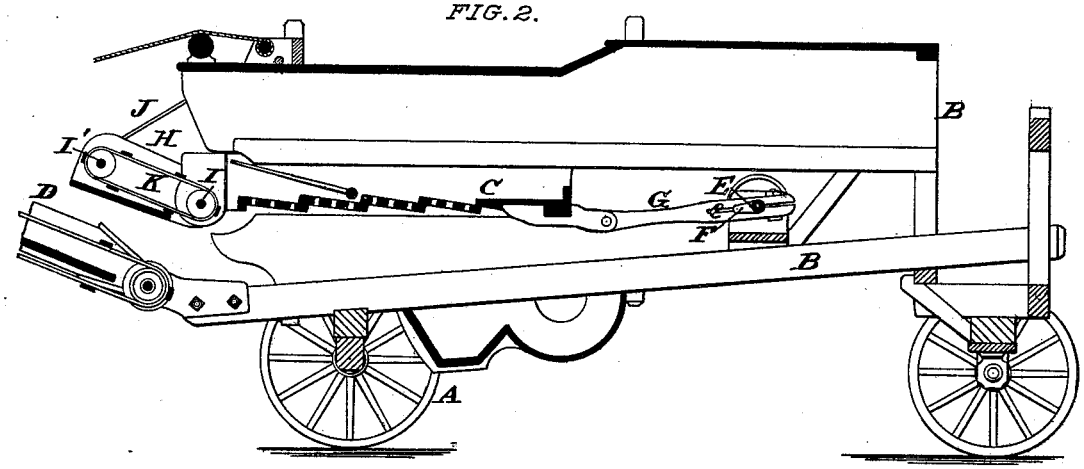

In the drawings, Figure 1 is a side elevation, and Fig. 2 is a longitudinal section, illustrating my invention.

The wheels are shown at A, the body at B, and the separating-pan at C. A part of the straw-carrier is shown at D.

No novelties are claimed in this application in the foregoing parts, except as far as apply to the pan-extension as aforesaid, and consequently no special description of the same is required.

E is a crank-shaft, whose crank F is connected by rod G to the pan C, as usual. At the tail end of the pan C is an upwardly-extending pan or extension, H, having an imperforate bottom to receive and hold the grain dropping out of the straw in its passage to the straw-carrier proper. This pan or extension H is connected to C by a rotating shaft, I, upon which it oscillates. The oscillation is caused by the longitudinal reciprocation of the pan C and links J, by which the tail end of the pan-extension H is connected to the body of the machine.

The links J are so inclined that the backward movement of the pan C causes the backward movement and upward oscillatory movement of the pan-extension H.

K is a straw-carrier, consisting of endless belts and cross-bars, and which is supported on pulleys upon the shaft I', at the tail end of the pan H.

Upon the shaft I is a pulley, L, upon which is a belt, M. The belt M also passes around a pulley, N, fixed eccentrically upon shaft E. The side $n$ of the pulley which projects the farthest from the shaft E coincides with the crank G, so that as the pans are moved backward with the crank the belt will move bodily backward an equal distance, (owing to the eccentricity of pulley N,) and the belt will be maintained at an equal tension upon the pulleys L and N.

Attention is called to the relative position of the main straw-carrier, a part of which is shown at D, and the pan H. It will be seen that the pan projects over the carrier sufficiently to insure the delivery of the straw upon the carrier. When the carrier is arranged to fold back upon the machine, the pan H would interfere if it were rigidly attached to the pan C. This difficulty is obviated by pivoting the pan H so that it may be turned upward and backward out of the way of the straw-carrier. The links J are made detachable from the pan, so as to admit of its being folded back in the manner described.

I claim as my invention—

1. The combination, with the main pan C, of the upwardly-extending and imperforate oscillating pan-extension H, substantially as and for the purpose set forth.

2. The combination, with the oscillating pan-extension H and pan C, of the straw-carrier K in said pan H.

3. The combination of reciprocating pan H, pulley L, belt M, and eccentric pulley N on crank-shaft E, turning in fixed bearings, substantially as described.

WILLIAM S. REEDER.

Witnesses:
SAML. KNIGHT,
GEO. H. KNIGHT.